United States Patent
Li et al.

(10) Patent No.: US 7,257,062 B2
(45) Date of Patent: Aug. 14, 2007

(54) METHOD FOR DETECTING ECCENTRICITY OF AN OPTICAL DISC, AND OPTICAL DISC DRIVE THAT PERFORMS THE METHOD

(75) Inventors: Yung-Chih Li, Pan-Chiao (TW); Hsu-Feng Ho, Taipei (TW); Kuang-Jung Chang, Taipei (TW)

(73) Assignee: Mediatek, Inc., Hsin-Chu (TW)

( * ) Notice: Subject to any disclaimer, the term of this patent is extended or adjusted under 35 U.S.C. 154(b) by 553 days.

(21) Appl. No.: 10/754,983

(22) Filed: Jan. 9, 2004

(65) Prior Publication Data

US 2005/0152246 A1 Jul. 14, 2005

(30) Foreign Application Priority Data

Sep. 12, 2003 (TW) .............................. 92125258 A (51) Int. Cl.
*G11B 5/09* (2006.01)
(52) U.S. Cl. .................. 369/47.44; 369/53.14
(58) Field of Classification Search ............. 369/47.44, 369/53.14; *G11B 5/09*
See application file for complete search history.

(56) References Cited

U.S. PATENT DOCUMENTS

| | | | | |
|---|---|---|---|---|
| 3,937,476 A * | 2/1976 | Sakai | .................... | 369/239 |
| 5,224,086 A * | 6/1993 | Wachi | .................... | 369/47.44 |
| 5,373,495 A * | 12/1994 | Takada | .................... | 369/189 |
| 5,615,191 A * | 3/1997 | Takeda et al. | ................ | 360/51 |
| 5,905,705 A * | 5/1999 | Takeda et al. | ................ | 360/51 |
| 6,181,652 B1 * | 1/2001 | Katou et al. | ............. | 369/44.32 |
| 6,370,094 B1 | 4/2002 | Kishinami et al. | | |
| 6,452,882 B1 | 9/2002 | Fukamachi | | |
| 6,700,844 B2 * | 3/2004 | Na | ........................ | 369/53.14 |
| 6,894,957 B1 * | 5/2005 | Shimada | .................. | 369/44.32 |
| 2003/0048717 A1 * | 3/2003 | Lee et al. | ................ | 369/53.18 |
| 2003/0099175 A1 | 5/2003 | Chan | | |

* cited by examiner

*Primary Examiner*—A M Psitos
(74) *Attorney, Agent, or Firm*—Thomas, Kayden, Horstemeyer & Risley (57) ABSTRACT

An optical disc drive includes a spindle motor and a computer program. The spindle motor is adapted for rotating an optical disc. The computer program configures the optical disc drive to perform consecutive steps of a method for detecting eccentricity of the optical disc, including: a) while the optical disc drive operates under focused and track-locked conditions, controlling the spindle motor to rotate the optical disc at a specified rotation speed; b) measuring an eccentricity value of the optical disc being rotated by the spindle motor; and c) comparing the eccentricity value measured in step b) with a reference value to determine extent of eccentricity of the optical disc.

13 Claims, 7 Drawing Sheets

METHOD FOR DETECTING ECCENTRICITY OF AN OPTICAL DISC, AND OPTICAL DISC DRIVE THAT PERFORMS THE METHOD

BACKGROUND OF THE INVENTION

1. Field of the Invention

The invention relates to a method for detecting eccentricity of an optical disc, and an optical disc drive configured by a computer program to perform the method.

2. Description of the Related Art

During a reproduction or recording operation of an optical disc drive, eccentricity of an optical disc may affect servo system control, which may disrupt the reproduction or recording operation. Hence, it is important to detect the eccentricity of the optical disc beforehand so that appropriate compensation may be conducted in order to ensure the integrity of the reproduction or recording operation.

In U.S. Patent Application Publication No. 2003/0099175, there is disclosed a process for computing eccentricity of a disk upon rotating. The process includes steps of starting a servo control system of a disk drive to rotate the disk at a specified angular velocity, measuring a track crossing speed of the servo control system at a focusing point on the disk (i.e., the optical disc drive is in a focused state but not in a track-locked state), and computing the eccentricity of the disc according to the specified angular velocity and the track crossing speed. In the proposed process, the track crossing speed is obtained from a tracking error signal. However, since the tracking error signal is also generated when a target optical disc is scratched, warped, or has a slightly offset center, miscalculation of the eccentricity of the disk is likely to occur.

Other methods for computing the eccentricity of an optical disc while an optical disc drive is in a focused state but not in a track-locked state are disclosed in U.S. Pat. Nos. 6,370,094 and 6,452,882. In the proposed methods of the aforesaid patents, disc eccentricity is determined as a function of the track pitch and the detected number of track crossings upon rotation of a disc. However, in the aforesaid patents, a normal optical disc having a high capacity and a low track pitch is easily misjudged as an eccentric one since a larger number of track crossings is detected within a same unit time period (or same displacement amount).

SUMMARY OF THE INVENTION

Therefore, the main object of the present invention is to provide a method for detecting eccentricity of an optical disc with relatively high accuracy.

Another object of the present invention is to provide an optical disc drive that performs the method of this invention.

According to one aspect of the present invention, there is provided a method for detecting eccentricity of an optical disc that is placed on an optical disc drive, comprising the steps of: a) while the optical disc drive operates under focused and track-locked conditions, controlling a spindle motor of the optical disc drive to rotate the optical disc at a specified rotation speed; b) measuring an eccentricity value of the optical disc being rotated by the spindle motor; and c) comparing the eccentricity value measured in step b) with a reference value to determine extent of eccentricity of the optical disc.

According to another aspect of the present invention, an optical disc drive comprises a spindle motor and a computer program. The spindle motor is adapted for rotating an optical disc. The computer program configures the optical disc drive to perform consecutive steps of a method for detecting eccentricity of the optical disc, the method including: a) while the optical disc drive operates under focused and track-locked conditions, controlling the spindle motor to rotate the optical disc at a specified rotation speed; b) measuring an eccentricity value of the optical disc being rotated by the spindle motor; and c) comparing the eccentricity value measured in step b) with a reference value to determine extent of eccentricity of the optical disc.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
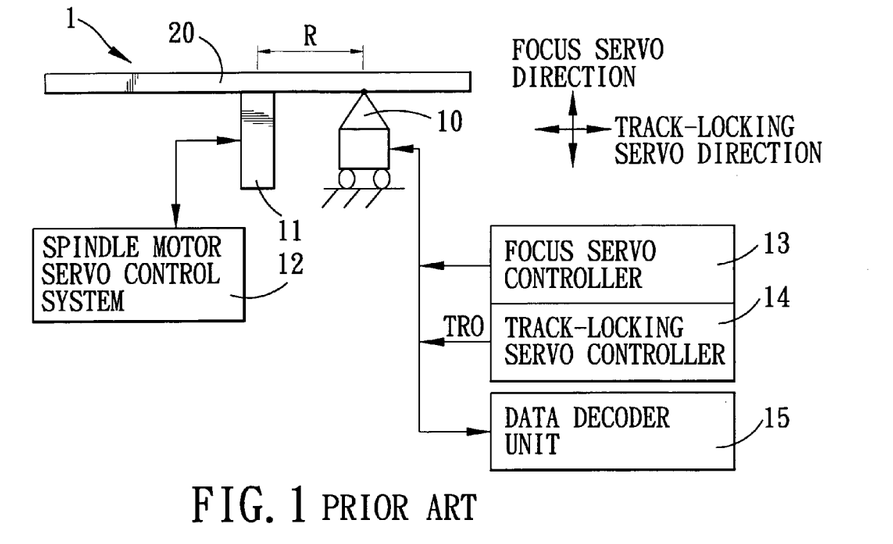
FIG. 1 is a schematic circuit block diagram to illustrate the general construction of an optical disc drive.

FIG. 1 is a schematic circuit block diagram to illustrate the general construction of an optical disc drive 1 that is applicable to the following preferred embodiments of the present invention. The optical disc drive 1 is shown to include a spindle motor 11 adapted for rotating an optical disc 20, a spindle motor servo control system 12 for controlling rotation of the spindle motor 11, an optical pickup head 10, a focus servo controller 13 for controlling focusing of the optical pickup head 10, a track-locking servo controller 14 for controlling track-locking of the optical pickup head 10, and a data decoder unit 15 for decoding data reproduced from the optical disc 20.

Figure 2:
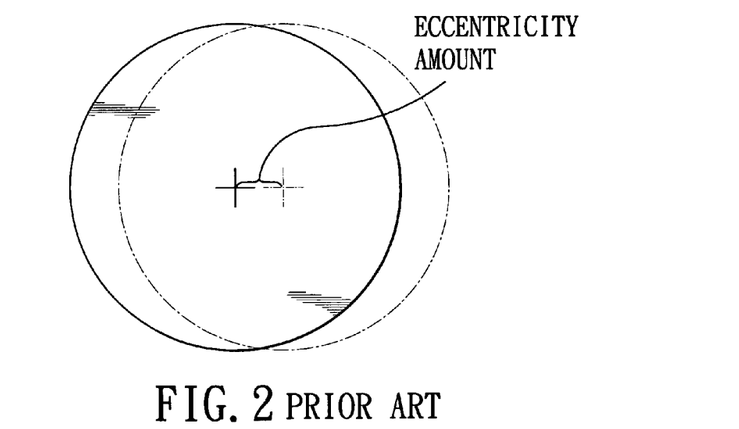
FIG. 2 illustrates an eccentric optical disc.

Referring to FIG. 2, when an eccentric optical disc is rotated by the optical disc drive, because of a shift in the center, the radii of recorded tracks vary continuously. Hence, focusing and track-locking during reproduction and recording of data on the eccentric optical disc are hard to control, which may disrupt the reproduction and recording of the data on the eccentric optical disc.

Figure 3:
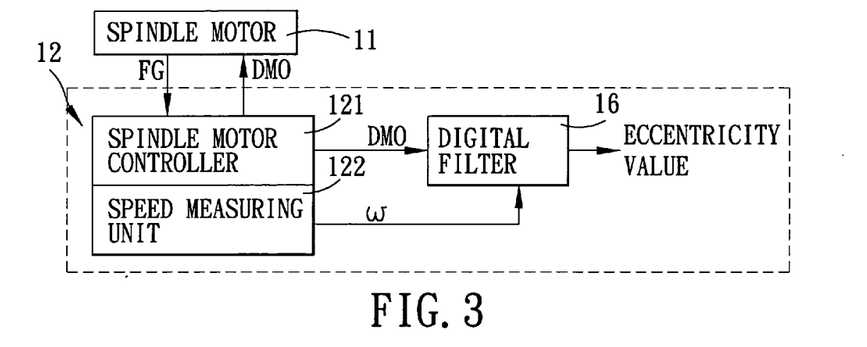
FIG. 3 is a schematic circuit block diagram to illustrate the configuration of an optical disc drive according to the first preferred embodiment of the present invention.

FIG. 3 illustrates the configuration of the first preferred embodiment of an optical disc drive according to the present invention when loaded with a proprietary computer program so as to be capable of detecting eccentricity of an optical disc 20 (see FIG. 1). In the first preferred embodiment, the spindle motor servo control system 12 is configured to include a spindle motor controller 121 and a speed measuring unit 122. The optical disc drive is further provided with a digital filter 16 coupled to the spindle motor servo control system 12. The spindle motor controller 121 generates a motor control signal (DMO) that is provided to the spindle motor 11 so as to control rotation speed of the spindle motor 11. The spindle motor 11 provides a rotation speed feedback signal (FG) to the speed measuring unit 122 so as to enable the latter to estimate a rotation speed value (i.e., angular velocity ($\omega$)) of the spindle motor 11.

Figure 4:
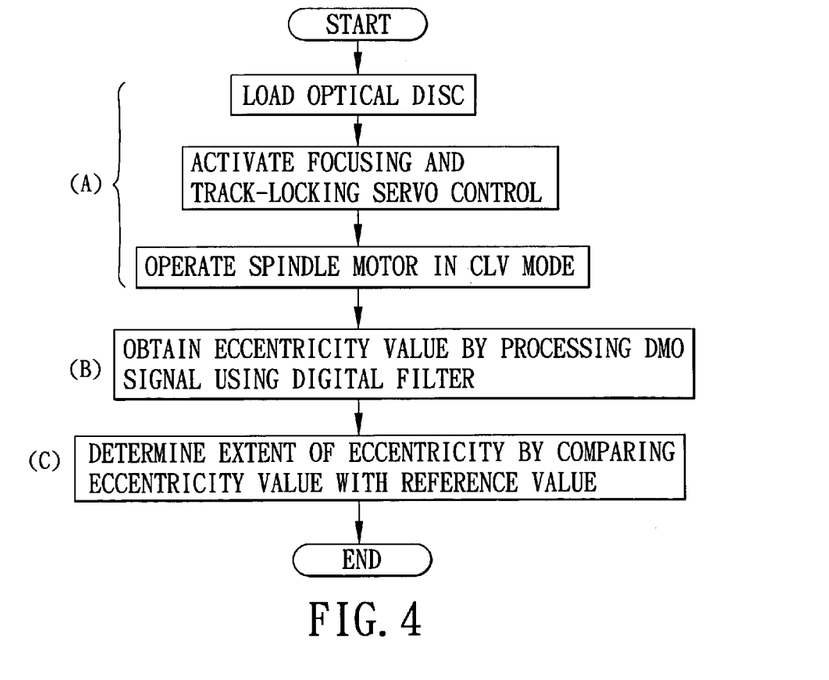
FIG. 4 is a flowchart to illustrate the method of the first preferred embodiment.
Figure 5:
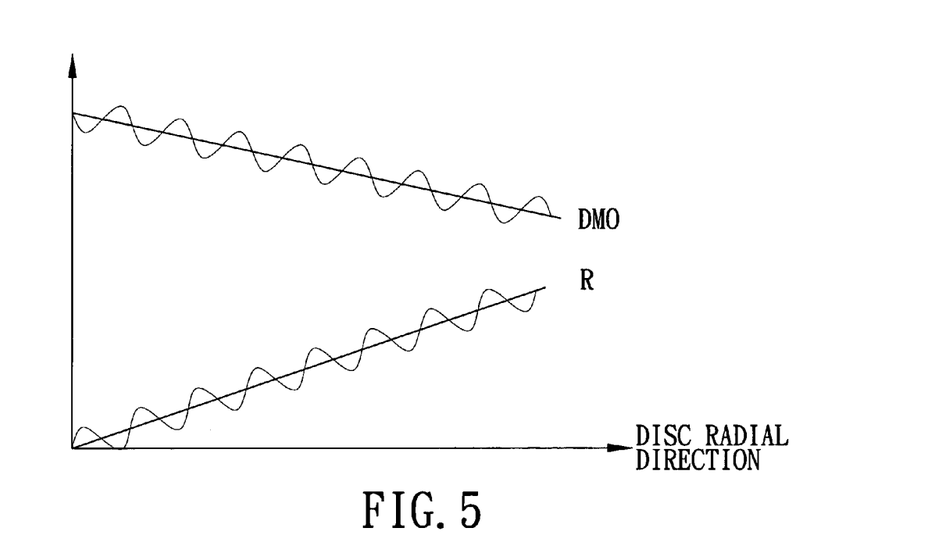
FIG. 5 is a diagram to illustrate a relationship between a DMO signal and a distance (R) between a focused point of an optical pickup head and a rotation center during rotation of an eccentric optical disc in accordance with the first preferred embodiment.

With further reference to FIG. 4, the proprietary computer program of the first preferred embodiment configures the optical disc drive to perform consecutive steps of a method for detecting eccentricity of the optical disc 20 that is placed on the optical disc drive. The method of the first preferred embodiment includes the following steps:

a) After placing the optical disc 20 on the optical disc drive, while the optical pickup head 10 (see FIG. 1) of the optical disc drive is operated under focused and track-locked conditions by virtue of the focus servo controller 13 and the track-locking servo controller 14, the spindle motor 11 of the optical disc drive is controlled by the motor control signal (DMO) from the spindle motor controller 121 to operate in a constant linear velocity (CLV) mode for rotating the optical disc 20. At this time, the angular velocity ($\omega$) of the spindle motor 11 changes continuously so that the linear velocity (V) remains unchanged.

b) An eccentricity value of the optical disc 20 being rotated by the spindle motor 11 is measured. Particularly, the eccentricity value is measured in this embodiment from the motor control signal (DMO) provided by the spindle motor controller 121. As shown in FIGS. 1 and 5, when the spindle motor 11 is operated in the CLV mode (the linear velocity (V) is constant), the distance between a rotation center of the optical disc 20 and a focused point of the optical pickup head 10 is (R), and R$\omega$=V. Therefore, for an eccentric optical disc 20, since (R) changes continuously during rotation of the optical disc 20, the motor control signal (DMO) for controlling the angular velocity ($\omega$) of the spindle motor 11 also changes accordingly so as to generate a sinusoidal wave.

Furthermore, to filter out noise from the motor control signal (DMO), the motor control signal (DMO) is provided to the digital filter 16 for wave filtering. In this embodiment, the digital filter 16 is a digital real-time on-line filter constructed from a digital signal processor (DSP) and associated circuit hardware. The digital filter 16 has a central frequency that varies according to a real-time acquired instantaneous angular velocity ($\omega$) of the spindle motor 11. In view of the foregoing, the digital filter 16 would process the digitized motor control signal (DMO) in order to provide an output value that is representative of an eccentricity value of the optical disc 20.

c) Finally, the eccentricity value measured in step b) is compared with at least a reference value to determine the extent of eccentricity of the optical disc 20. The reference value was obtained beforehand by placing an optical disc having a known eccentricity on the optical disc drive, and performing steps a) and b) (This procedure is otherwise known as a calibration procedure). During the calibration procedure, reference values for a number of optical discs having different known eccentricities could be obtained. The reference values thus obtained are subsequently compared with the measured eccentricity value of the tested optical disc so that a more accurate measurement of the extent of eccentricity of the latter may be acquired.

Figure 6:
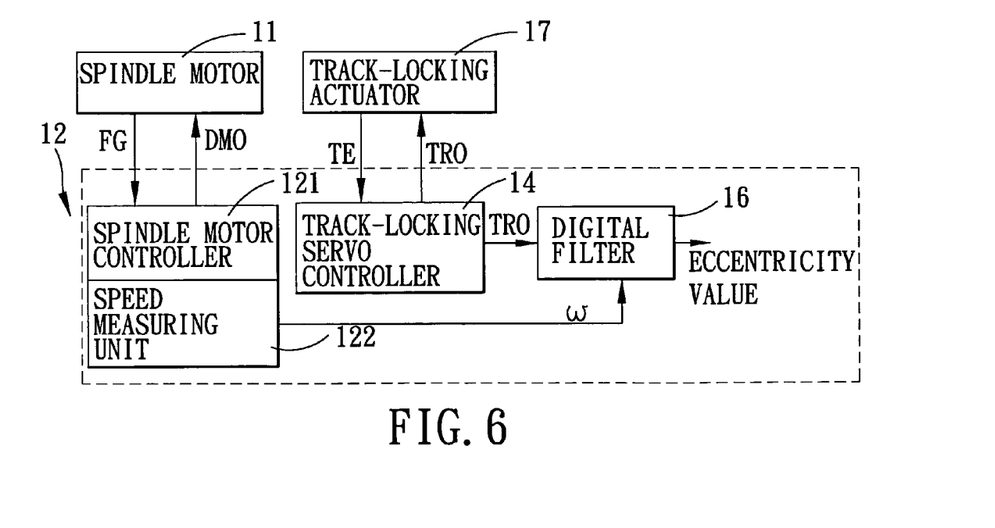
FIG. 6 is a schematic circuit block diagram to illustrate the configuration of an optical disc drive according to the second preferred embodiment of the present invention.

FIG. 6 illustrates the configuration of the second preferred embodiment of an optical disc drive according to the present invention when loaded with a proprietary computer program so as to be capable of detecting the eccentricity of an optical disc 20 (see FIG. 1). In this embodiment, the optical disc drive further includes a track-locking actuator 17 coupled to the track-locking servo controller 14 for receiving a track-locking servo control signal (TRO) therefrom, thereby controlling real-time track-locking action of the optical pickup head 10 (see FIG. 1).

Figure 7:
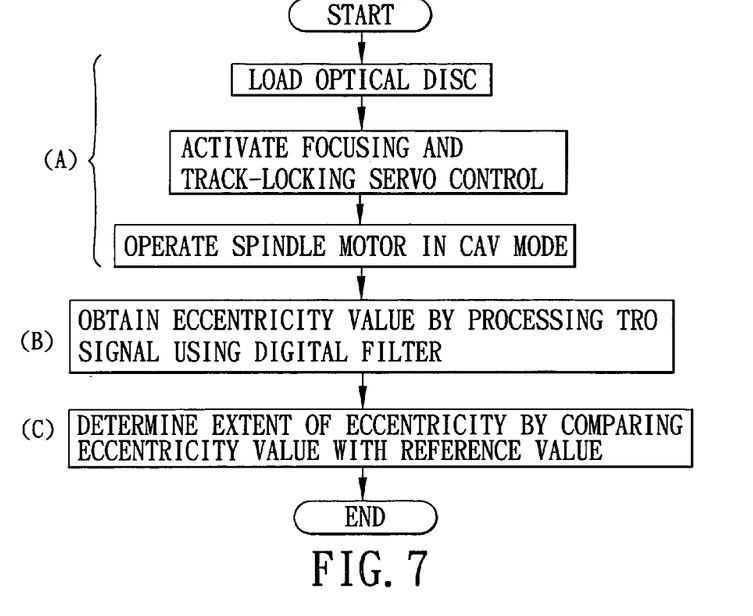
FIG. 7 is a flowchart to illustrate the method of the second preferred embodiment.
Figure 8:
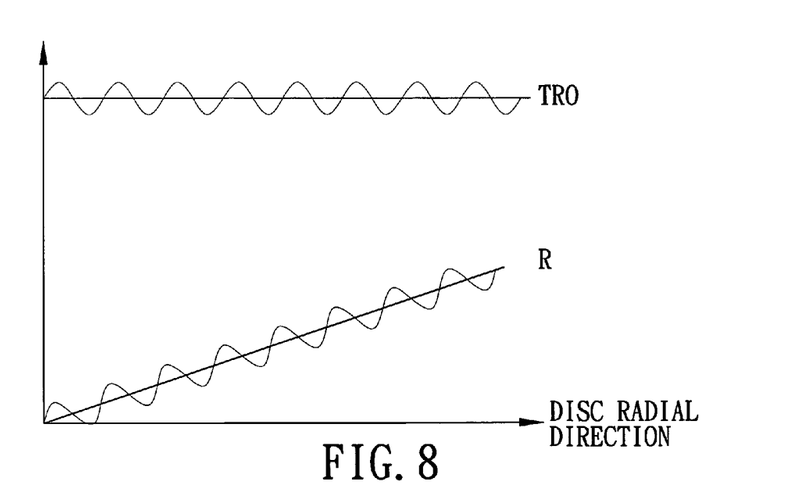
FIG. 8 is a diagram to illustrate the relationship between a TRO signal and a distance (R) between a focused point of an optical pickup head and a rotation center during rotation of an eccentric optical disc in accordance with the second preferred embodiment.

With further reference to FIG. 7, the proprietary computer program of the second preferred embodiment configures the optical disc drive to perform consecutive steps of a method for detecting eccentricity of the optical disc 20 that is placed on the optical disc drive. The method of the second preferred embodiment includes the following steps:

a) After placing the optical disc 20 on the optical disc drive, while the optical pickup head 10 of the optical disc drive is operated under focused and track-locked conditions, the spindle motor 11 of the optical disc drive is controlled by the motor control signal (DMO) from the spindle motor controller 121 to operate in a constant angular velocity (CAV) mode for rotating the optical disc 20. At this time, while the angular velocity ($\omega$) of the spindle motor 11 is constant, based on the relation R$\omega$=V, as the distance (R) of the focused point of the optical pickup head 10 from the rotation center of the optical disc 20 increases, the linear velocity (V) increases as well.

b) An eccentricity value of the optical disc 20 being rotated by the spindle motor 11 is measured. Particularly, the eccentricity value is measured in this embodiment from the track-locking servo control signal (TRO) provided by the track-locking servo controller 14. With reference to FIGS. 1 and 8, when the spindle motor 11 is operated in the CAV mode (i.e., the angular velocity ($\omega$) is constant), since the distance (R) changes continuously during rotation of an eccentric optical disc 20, and since R$\omega$=V, the linear velocity (V) also changes accordingly. Therefore, for the eccentric optical disc 20, the track-locking control signal (TRO) also changes with the distance (R) so as to generate a sinusoidal wave.

Furthermore, like the previous embodiment, to filter out noise from the track-locking servo control signal (TRO), the latter is provided to the digital filter 16 for wave filtering in the manner described hereinabove. The output of the digital filter 16 represents an eccentricity value of the optical disc 20.

c) Finally, as with the previous embodiment, the eccentricity value measured in step b) is compared with at least a reference value to determine the extent of eccentricity of the optical disc 20.

Figure 9:
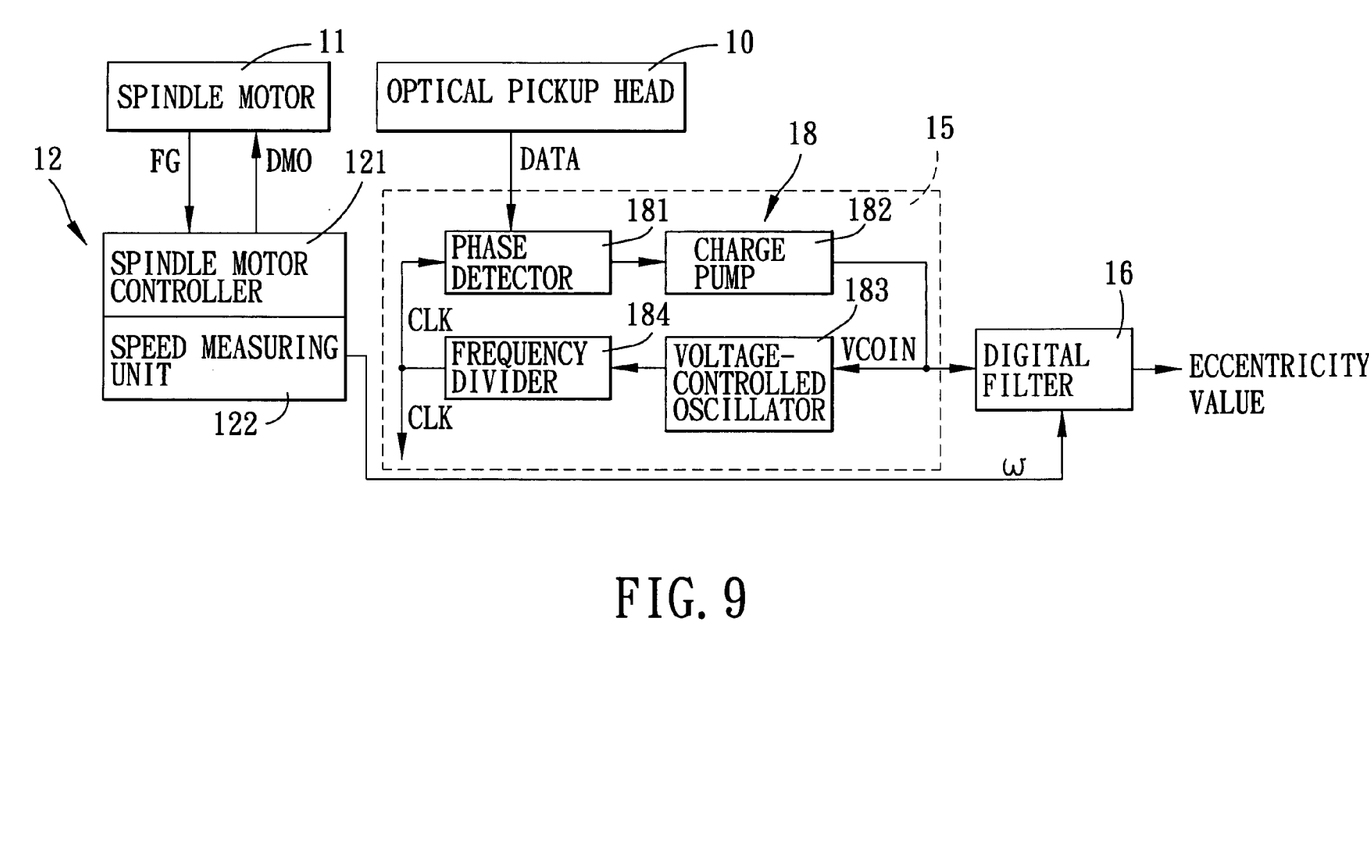
FIG. 9 is a schematic circuit block diagram to illustrate the configuration of an optical disc drive according to the third preferred embodiment of the present invention.

FIG. 9 illustrates the configuration of the third preferred embodiment of an optical disc drive according to the present invention when loaded with a proprietary computer program so as to be capable of detecting the eccentricity of an optical disc 20 (see FIG. 1). In this embodiment, the data decoder unit 15 of the optical disc drive 1 is shown to include a phase-locked loop 18. The phase-locked loop 18 includes a phase detector 181, a charge pump 182, a voltage-controlled oscillator 183, and a frequency divider 184. An analog data signal (DATA) reproduced by the optical pickup head 10 from the optical disc 20 is received by the phase detector 181 of the phase locked loop 18, and is processed by the phase detector 181 and the charge pump 182 to result in a control signal (VCOIN) to the voltage-controlled oscillator 183. The output of the voltage-controlled oscillator 183 is processed by the frequency divider 184 to result in a pulse signal (CLK) that is synchronized with the analog data signal (DATA).

Figure 10:
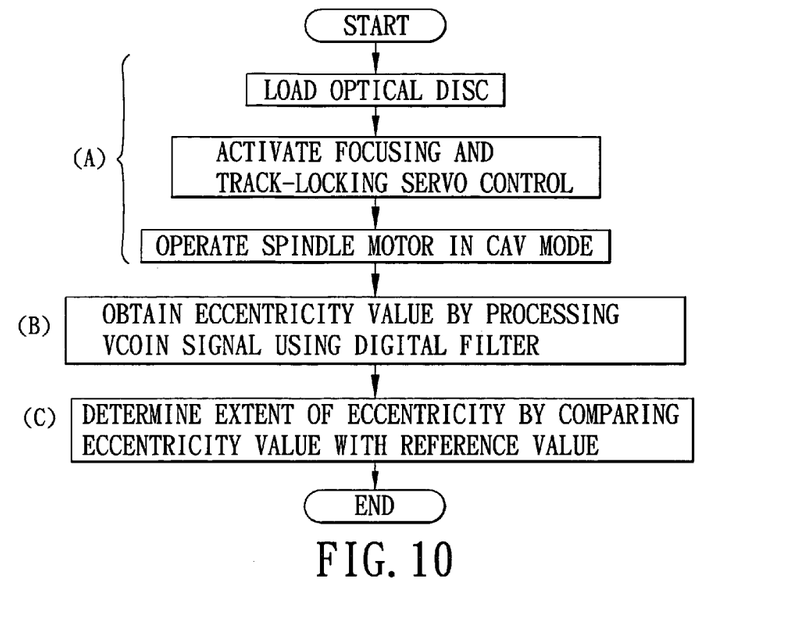
FIG. 10 is a flowchart to illustrate the method of the third preferred embodiment.
Figure 11:
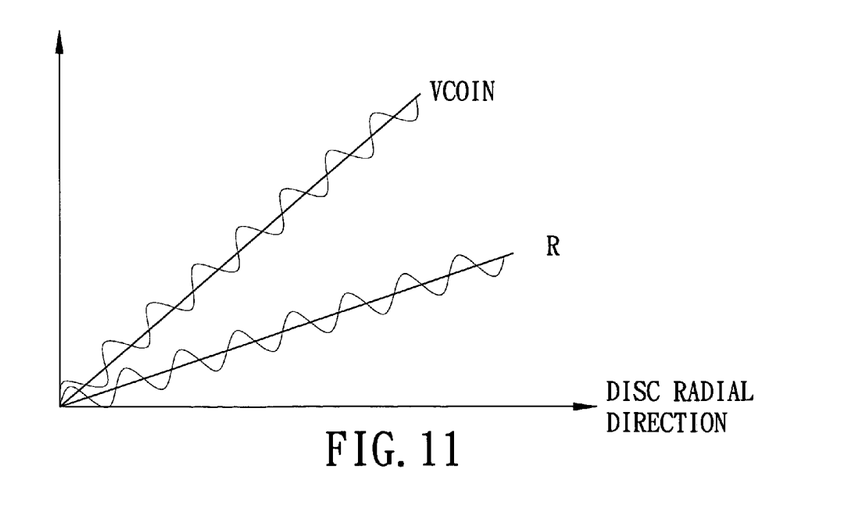
FIG. 11 is a diagram to illustrate the relationship between a VCOIN signal and a distance (R) between a focused point of an optical pickup head and a rotation center during rotation of an eccentric optical disc in accordance with the third preferred embodiment.

With further reference to FIG. 10, the proprietary computer program of the third preferred embodiment configures the optical disc drive to perform consecutive steps of a method for detecting eccentricity of the optical disc 20 that is placed on the optical disc drive. The method of the third preferred embodiment includes the following steps:

a) After placing the optical disc 20 on the optical disc drive, while the optical pickup head 10 of the optical disc drive is operated under focused and track-locked conditions, the spindle motor 11 of the optical disc drive 1 is controlled to operate in the constant angular velocity (CAV) mode for rotating the optical disc 20.

b) An eccentricity value of the optical disc 20 being rotated by the spindle motor 11 is measured. With reference to FIGS. 1 and 11, when the spindle motor 11 is operated in the CAV mode, since the distance (R) changes continuously during rotation of an eccentric optical disc 20, the analog data signal (DATA) from the optical pickup head 10 also changes accordingly. The change in the analog data signal (DATA) is reflected in the control signal (VCOIN) to the voltage-controlled oscillator 183 so as to generate a sinusoidal wave. The change in the control signal (VCOIN) is an indication of a data rate of data reproduced from the optical disc 20 that is used in this embodiment as a measure of the eccentricity value of the optical disc 20.

Furthermore, to filter out noise from the control signal (VCOIN), the control signal (VCOIN) is provided to the digital filter 16 for wave filtering in a manner similar to that described in connection with the first preferred embodiment. The output of the digital filter 16 represents the eccentricity value of the optical disc 20.

c) Finally, as with the previous embodiments, the eccentricity value measured in step b) is compared with at least a reference value to determine the extent of eccentricity of the optical disc 20.

Figure 12:
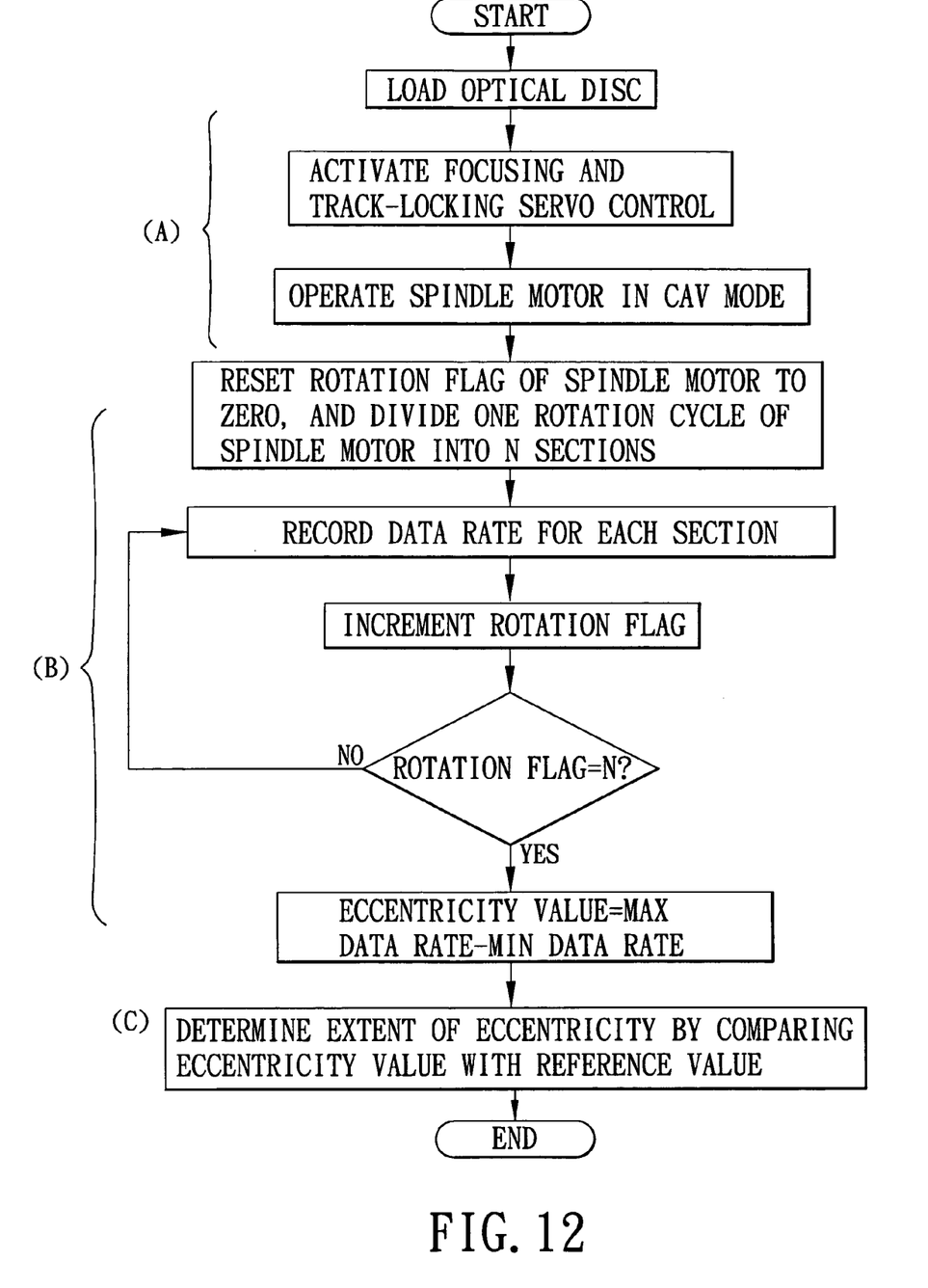
FIG. 12 is a flowchart to illustrate the method of the fourth preferred embodiment according to the present invention.

Referring to FIG. 12, the proprietary computer program of the fourth preferred embodiment of this invention configures an optical disc drive to perform consecutive steps of a method for detecting eccentricity of an optical disc 20 (see FIG. 1) that is placed on the optical disc drive. The method of the fourth preferred embodiment includes the following steps:

a) After placing the optical disc 20 on the optical disc drive, while the optical pickup head 10 (see FIG. 1) of the optical disc drive is operated under focused and track-locked conditions, the spindle motor 11 (see FIG. 1) of the optical disc drive is controlled to operate in the constant angular velocity (CAV) mode for rotating the optical disc 20.

b) A rotation flag of the spindle motor 11 is reset to zero, and a rotation cycle of the spindle motor 11 is divided into N sections. During a rotation cycle of the spindle motor 11, the data rate of data reproduced from the optical disc 20 is recorded for each section. An eccentricity value of the optical disc 20 corresponds to a difference between maximum and minimum values of the recorded data rates.

c) Finally, like the previous embodiments, the eccentricity value measured in step b) is compared with at least a reference value to determine the extent of eccentricity of the optical disc 20.

In sum, by controlling a spindle motor of the optical disc drive to rotate the optical disc at a specified rotation speed (either in the CLV or CAV mode) while an optical pickup head of the optical disc drive operates under focused and track-locked conditions, and by subsequently processing either the DMO signal, the TRO signal or the VCOIN signal using the digital filter 16, or by determining the difference between maximum and minimum data rates during one cycle of rotation of the optical disc, the eccentricity value of the optical disc 20 may be obtained for comparison with at least a predetermined reference value. As such, the extent of eccentricity of the optical disc 20 may be determined with greater accuracy as compared to the methods proposed in the prior art.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for detecting eccentricity of an optical disc that is placed on an optical disc drive, comprising the steps of:
   a) while the optical disc drive operates under focused and track-locked conditions, controlling a spindle motor of the optical disc drive to rotate the optical disc at a specified rotation speed;
   b) measuring an instantaneous angular velocity of the spindle motor;
   c) generating an eccentricity value based on the instantaneous angular velocity; and
   d) comparing the eccentricity value with a reference value to determine extent of eccentricity of the optical disc; wherein the reference value is associated with a calibration disc having a known eccentricity.

2. The method as claimed in claim 1, wherein, in step a), the spindle motor is controlled to operate in a constant linear velocity mode.

3. The method as claimed in claim 2, wherein:
   step a) further comprises:
   providing a motor control signal (DM0) to the spindle motor to rotate the optical disc; and
   measuring a rotation speed feedback signal (FG) sent from the spindle motor to determine the instantaneous angular velocity.

4. The method as claimed in claim 3, wherein the reference value is obtained by placing the calibration disc on the optical disc drive, and performing steps a), b) and c).

5. The method as claimed in claim 3, wherein step c) is performed by a digital filter having a central frequency that varies according to the instantaneous angular velocity of the spindle motor.

6. The method as claimed in claim 1, wherein, in step a), the spindle motor is controlled to operate in a constant angular velocity mode.

7. The method as claimed in claim 6, wherein in step c), the eccentricity value is a difference between maximum and minimum data rates of data reproduced from the optical disc during one cycle of rotation of the optical disc.

8. The method as claimed in claim 6, wherein,
step a) further comprises providing a track-locking servo control signal (TRO) for track-lock; and
in step c), the track-locking servo control signal is filtered to generate the filtered eccentricity value.

9. The method as claimed in claim 8, wherein the reference value is obtained by placing the calibration disc on the optical disc drive, and performing steps a), b) and c).

10. The method as claimed in claim 9, wherein step c) is performed by a digital filter having a central frequency that varies according to the instantaneous angular velocity of the spindle motor.

11. The method as claimed in claim 6, wherein,
step a) further comprises providing a control signal (VOGIN) for a voltage-controlled oscillator of a phase-lock loop of the optical disc drive; and
in step c), the control signal is filtered to generate the eccentricity value.

12. The method as claimed in claim 11, wherein step c) is performed by a digital filter having a central frequency that varies according to the instantaneous angular velocity of the spindle motor.

13. The method as claimed in claim 12, wherein the reference value is obtained by placing the calibration disc on the optical disc drive, and performing steps a), b) and c).

* * * * *